United States Patent
Ramey

(10) Patent No.: US 6,579,187 B2
(45) Date of Patent: Jun. 17, 2003

(54) SHIELD FOR USE IN A CONSTANT VELOCITY JOINT

(75) Inventor: John A. Ramey, St. Clair Shores, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/845,069

(22) Filed: Apr. 30, 2001

(65) Prior Publication Data

US 2002/0160842 A1 Oct. 31, 2002

(51) Int. Cl.[7] .................................................. F16D 3/84
(52) U.S. Cl. ........................... 464/17; 464/15; 464/145; 464/175; 403/23; 403/51
(58) Field of Search ................................ 464/906, 170, 464/175, 173, 145, 139, 15, 17; 403/23, 50, 51; 277/635

(56) References Cited

U.S. PATENT DOCUMENTS

| | | | | | |
|---|---|---|---|---|---|
| 3,204,427 A | * | 9/1965 | Dunn | ............................ | 467/7 |
| 3,583,244 A | * | 6/1971 | Teinert | ........................ | 403/51 |
| 3,633,382 A | * | 1/1972 | Westercamp | ................ | 464/145 |
| 4,392,838 A | * | 7/1983 | Welschof et al. | ........... | 464/175 |
| 4,516,959 A | * | 5/1985 | Krude | ........................ | 464/175 |
| 4,560,178 A | * | 12/1985 | Hempel | ..................... | 464/175 |
| 5,297,996 A | * | 3/1994 | Draga | ........................ | 464/175 |
| 5,954,587 A | * | 9/1999 | Jacob et al. | ................. | 464/145 |
| 6,319,132 B1 | * | 11/2001 | Krisher | ....................... | 464/143 |
| 6,368,224 B1 | * | 4/2002 | Knodle et al. | .............. | 464/146 |

* cited by examiner

Primary Examiner—Lynne H. Browne
Assistant Examiner—Kenneth Thompson
(74) Attorney, Agent, or Firm—Mick A. Nylander

(57) ABSTRACT

A barrier for use in a constant velocity joint wherein the constant velocity joint has a lubricant within an outer race and a boot secured to a boot cover. The barrier includes a shield wherein that shield is in contact with the outer race and the boot cover. The shield generally has a body with a cup shaped cross section and a circumferential flange extending therefrom. The shield provides a barrier between the boot and the heat and grease lubricant of the constant velocity joint.

15 Claims, 3 Drawing Sheets

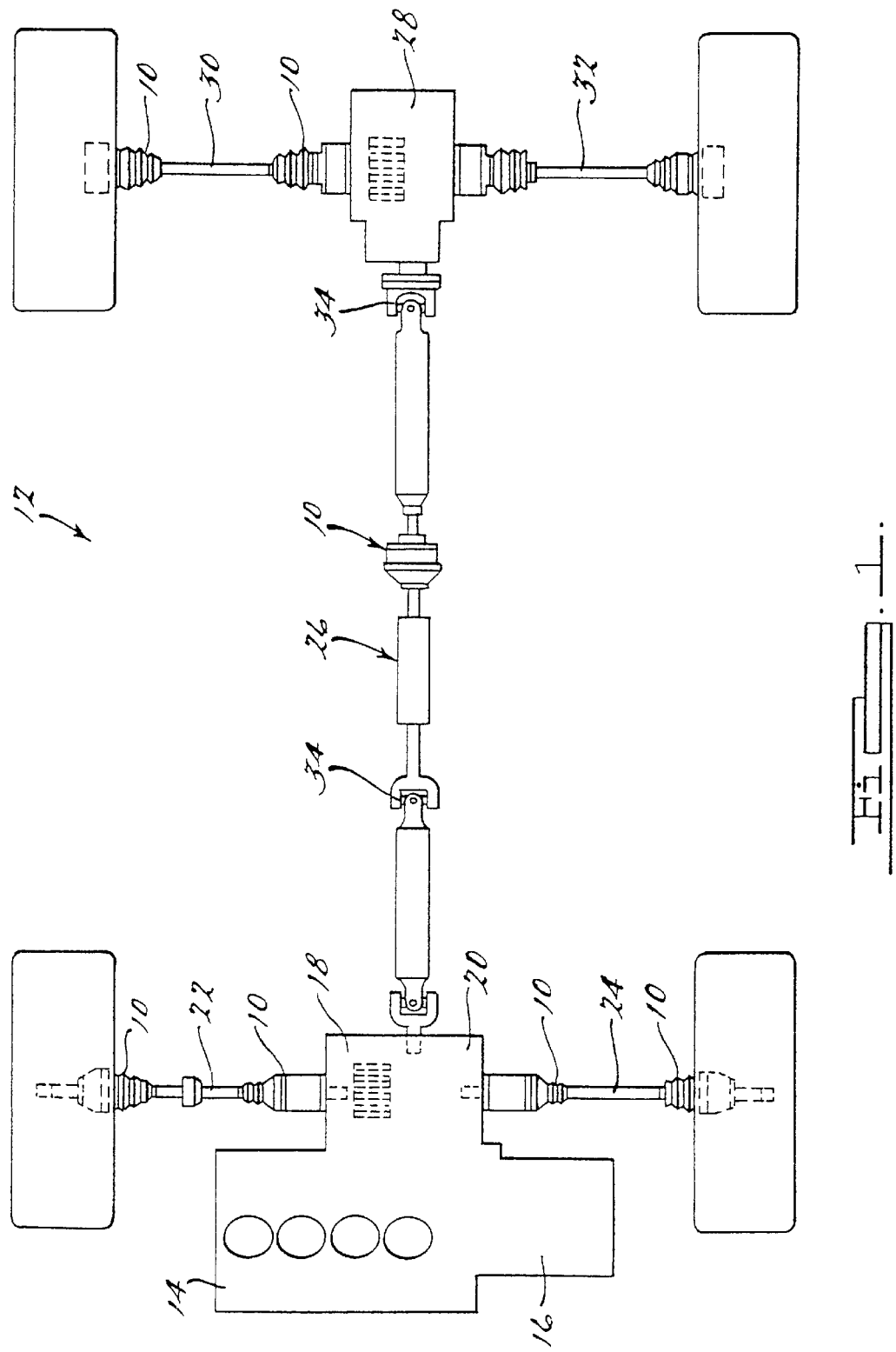

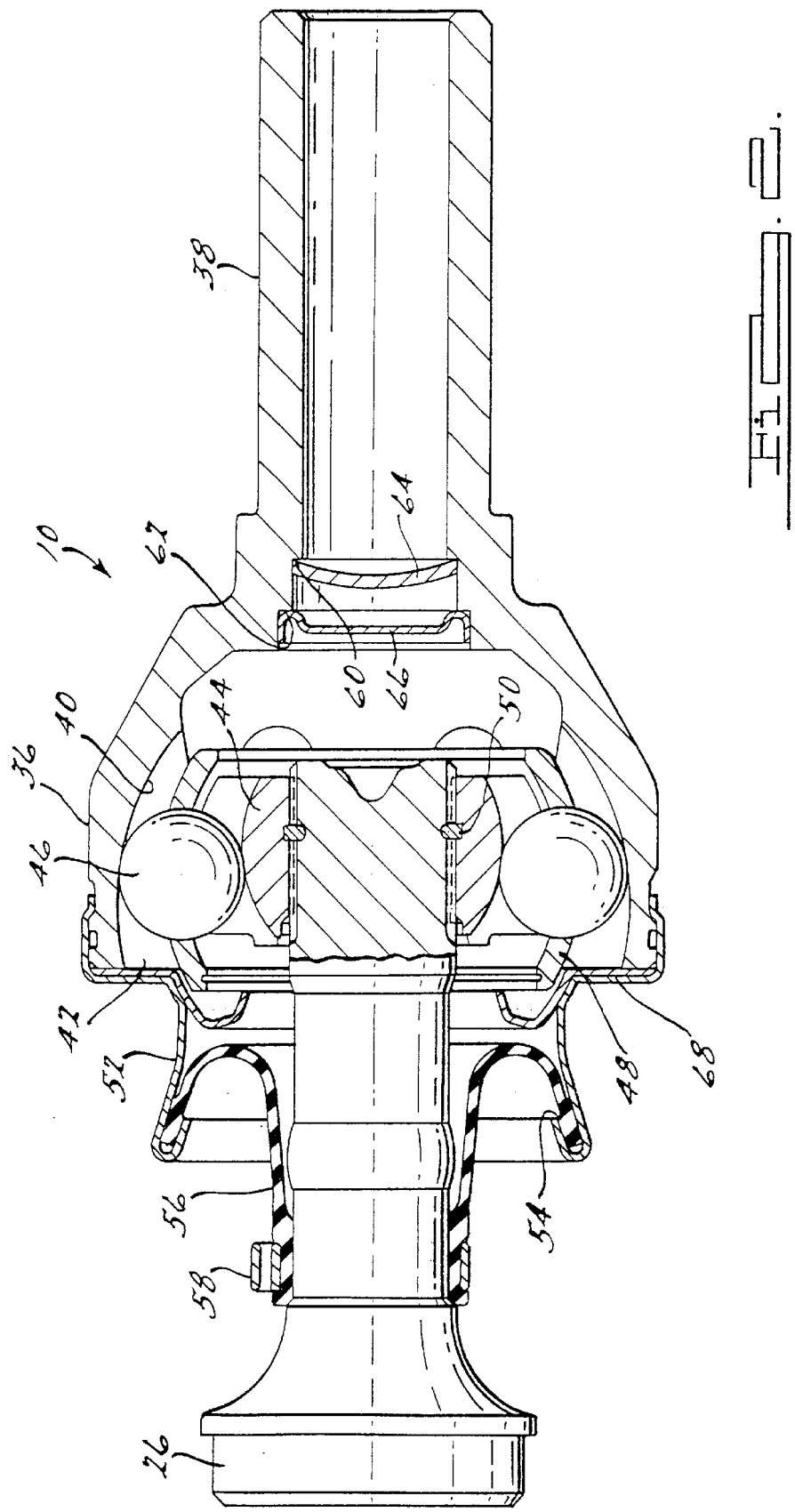

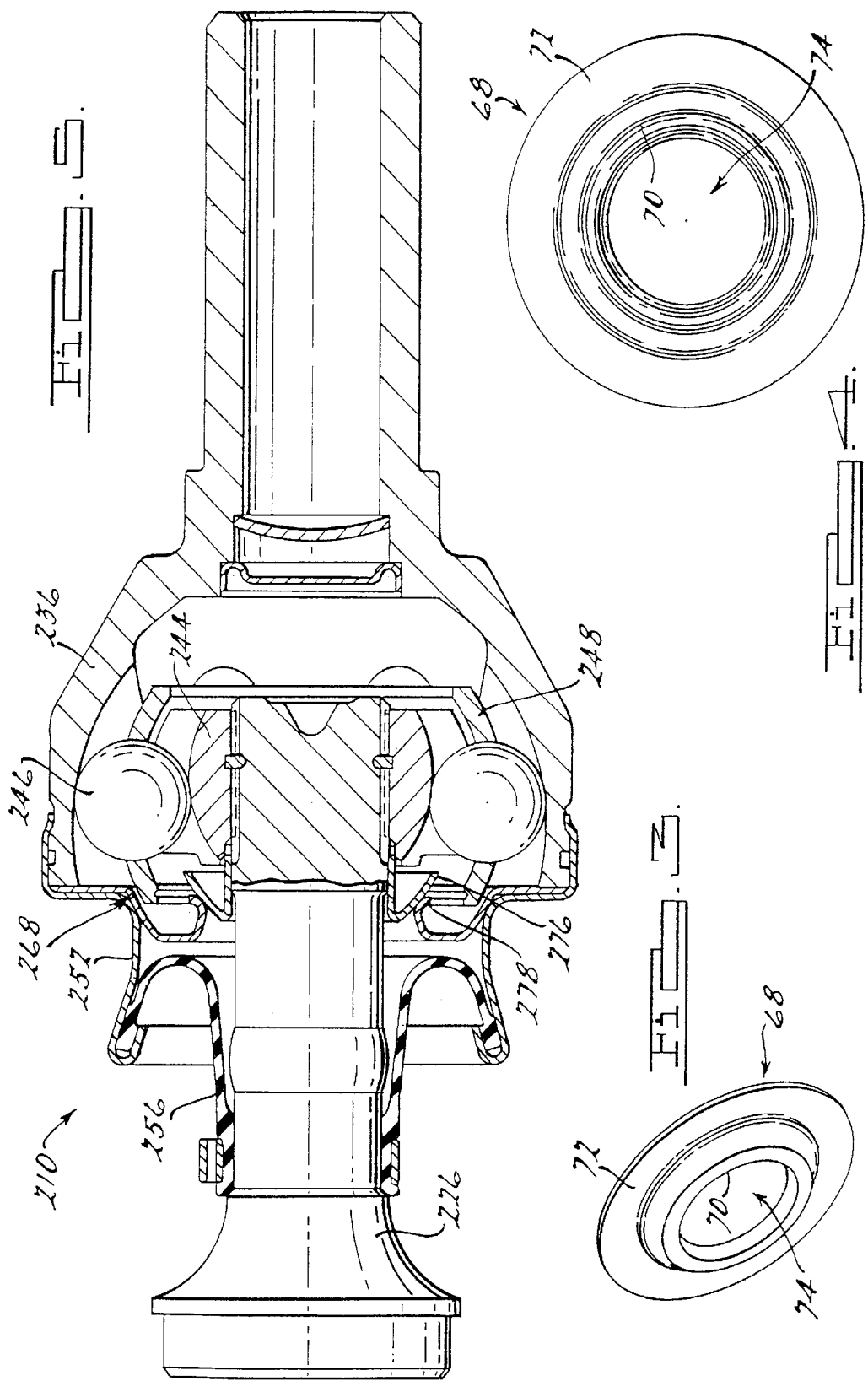

SHIELD FOR USE IN A CONSTANT VELOCITY JOINT

TECHNICAL FIELD

The present invention generally relates to constant velocity joints, and more particularly, relates to a shield for use within a constant velocity joint.

BACKGROUND ART

Constant velocity joints (CV joints) are common components in automotive vehicles. Typically, constant velocity joints are used where transmission of a constant velocity rotary motion is desired or acquired. The common types of constant velocity joints are a plunging tripod, a fixed tripod, a plunging ball joint and a fixed ball joint. These types of joints currently are used in front wheel drive vehicles, rear wheel drive vehicles and on the propeller shafts found in rear wheel drive, all wheel drive and four wheel drive vehicles. The constant velocity joints are generally grease lubricated for life and sealed by a sealing boot when used on drive shafts. Therefore, constant velocity joints are sealed in order to retain grease inside the joint while keeping contaminates and foreign matter, such as dirt and water, out of the joint. To achieve this protection the constant velocity joint is usually enclosed at the open end of the outer case by a sealing boot made of a rubber, thermoplastic or silicone. The opposite end of the outer race generally is enclosed by a dome or cap, known as a grease cap in the case of a disk type of joint. A monoblock or integral stem and race design style joint is sealed by the internal geometry of the outer race. This sealing and protection of the constant velocity joint is necessary because contamination of the inner chamber of the outer joint generally will cause internal damage and destruction of the joint. Furthermore, once the inner chamber of the outer joint is partially filled and thus lubricated, it is lubricated for life.

A constant velocity joint's main function is the transmission of rotational movement. During operation, the constant velocity joint transmits torque. The torque transfer generates heat by the internal frictions of the joint along with other transmission inefficiencies. Generally, as the speed and torque increase, the heat generation of the constant velocity joint also increases. A further effect of increased speeds is that the velocity of the grease increases because the internal action of the ball in the tracks acts like a pump which cause the grease to be pumped out of the tracks and into the boot. This causes increased pressure on the boot. High internal temperatures in the constant velocity joint effect the lubricant grease, which is in contact with the boot. With higher temperatures the boot becomes vulnerable to cracking and rupture which will reduce the life of the constant velocity joint, which is supposed to be sealed for life. Furthermore, if any heat that is created is transferred to the outer race, it is thereafter transferred to the boot which will further reduce the life of the boot material and create premature cracks, ruptures and blow outs of the boot thus compromising the constant velocity joint. The grease/heat shield prevents this pumping action of the grease into the boot.

Therefore, there is a need in the art for a constant velocity joint that is able to protect the boot and sealing system from the heat and grease found within the constant velocity joint. The heat and lubricant must be kept from contacting and deteriorating the boot which will result in eventual failure of the sealing system of the constant velocity joint.

BRIEF SUMMARY OF THE INVENTION

One object of the present invention is to provide an improved constant velocity joint.

Another object of the present invention is to provide a barrier between the boot and sealing system of a constant velocity joint and the heat and lubricant found within the constant velocity joint.

Yet a further object of the present invention is to provide a two piece barrier for a constant velocity joint.

Still a further object of the present invention is to provide a shield that will also act as a gasket allowing it to create an o-ring type seal.

Yet a further object of the present invention is to provide a shield made of a material that has insulating characteristics that will reduce any heat transfer.

To achieve the foregoing objects a barrier for use in constant velocity joint is disclosed. The constant velocity joint has a lubricant within an outer race and a boot secured to a boot cover. The barrier includes a shield that is in contact with the outer race and the boot cover. The shield will have a body with a generally cup shaped cross section and have a circumferential flange extending from one end thereof.

One advantage of the present invention is that the constant velocity joint will have a shield that will keep grease and/or lubricant away from the boot therefore increasing the life of the boot.

A further advantage of the present invention is that the shield will create an insulating air gap further protecting the boot from heat and grease.

Still a further advantage of the present invention is that the shield will be made of material that will have insulating characteristics and will reduce the heat transfer from the outer race to the boot cover.

A further advantage of the present invention is that the shield will also act as a gasket like o-ring to create a seal between the boot cover and the outer race of the constant velocity joint.

A further advantage of the present invention is that the shield prevents a pumping action of the lubricant into the boot.

Other objects, features and advantages of the present invention will become apparent from the subsequent description and appended claims taken in conjunction with the accompanying drawings.

BRIEF DESCRIPTION OF THE DRAWINGS

FIG. 1 shows a plan view of a vehicle drive line.

FIG. 2 shows a cross section of a constant velocity joint according to the present invention.

FIG. 3 shows a plan view of the shield according to the present invention.

FIG. 4 shows a top view of the shield according to the present invention.

FIG. 5 shows an alternate embodiment of the constant velocity joint according to the present invention.

BEST MODE FOR CARRYING OUT THE INVENTION

Referring to the drawings, a constant velocity joint 10 according to the present invention is shown. It should be noted that all types of CV joints such as a plunging tripod, a fixed tripod, etc. may also be used with the present invention.

FIG. 1 shows a typical drive line 12 of an automotive vehicle. The drive line 12 in FIG. 1 can be a typical all wheel drive vehicle, however, it should be noted that the constant velocity joints 10 of the current invention can also be used in rear wheel drive vehicles, front wheel drive vehicles, all wheel drive vehicles and four wheel drive vehicles. The drive line 12 includes an engine 14 that is connected to a transmission 16 and a power take off unit 18. The front differential 20 has a right hand side half shaft 22 and a left hand side half shaft 24 each of which are connected to a wheel and deliver power to those wheels. On both ends of the right hand front half shaft 22 and left hand front half shaft 24 are constant velocity joints 10. A propeller shaft 26 connects the front differential 20 to the rear differential 28, wherein the rear differential 28 includes a rear right hand side shaft 30 and a rear left hand side shaft 32, each of which ends with a wheel on one end thereof. A constant velocity joint 10 is located on both ends of the half shaft that connect to the wheel and the rear differential 28. The propeller shaft 26, shown in FIG. 1, is a three piece propeller shaft that includes a plurality of Cardan joints 34 and one high speed constant velocity joint 10. The constant velocity joints 10 transmit power to the wheels through the drive shaft even if the wheels or the shaft have changing angles due to steering, raising or lowering of the suspension of the vehicle. The constant velocity joints 10 may be any of the standard types known such as a plunging tripod, cross groove joint, fixed joint, a fixed tripod joint, or double offset joints, all of which are commonly known terms in the art for different varieties of constant velocity joints. The constant velocity joints 10 allow for transmission of constant velocities at angles which are found in every day driving of automotive vehicles in both the half shafts and prop shafts of these vehicles.

FIGS. 2, 3 and 4 show the preferred embodiment of the current invention. The constant velocity joint 10 is a fixed constant velocity joint which is generally used in the prop shaft 26 in an all wheel drive vehicle. It should be noted that another type of CV joint may also be used. The constant velocity joint 10 includes an outer race 36 which has an integral shaft 38 attached to one end thereof. An inner wall 40 of the outer race generally defines a constant velocity joint chamber 42. An inner race 44 is located or housed within the outer race 36. The inner race 44 is connected to the drive shaft or prop shaft 26 of the vehicle. A ball or rolling element 46 is located between an outer surface of the inner race and the inner wall of the outer race. The ball 46 is held in position between the outer race and inner race surfaces by a cage 48. Each race ball 46 is located within an indentation of the outer race inner surface. The rotation of the outer race 36 will rotate the inner race 44 at the same or constant speed thus allowing for constant velocity to flow through the joint and between the prop shaft and the power take off unit at angles up to a predetermined fixed angle. The constant velocity joint 10 will allow the angle to change because the balls 46 will rotate and compensate for any difference in the angle between the shafts by moving within the outer race and inner race indentations.

A ring retainer 50 is located on an inside surface of the inner race to allow for connection of the prop shaft 26 to the inner race 44. A boot cover 52 is connected to an end of the outer race 36. One end of the boot cover 52 has a channel 54 that runs along the entire periphery of the boot cover 52. A boot member 56, which in the preferred embodiment is made of urethane, however it should be noted that any other type of a hard plastic or soft rubber like material may also be used, is secured within the channel 54 of the boot cover 52 while the other end of the boot 56 engages the drive shaft 26 and is held in place by a boot clamp 58. The boot 56 will seal the constant velocity joint 10 from any outside contaminates, such as water, dirt and road grime. The suppleness of the boot 56 allows for a seal to be maintained through any angle of inclination that the drive shafts or half shafts may encounter during normal driving operations. An interior surface of the outer race includes a first shoulder portion 60 and a second shoulder portion 62. The first shoulder portion 60 includes a first plug or cover 64 which is generally made of a metal material and seals the outer race and chamber from transmission oils or contaminates from the transmission. In contact with the second shoulder 62 of the outer race is a second plug or cover 66 which in the preferred embodiment is made of metal but may be made of any other type of hard ceramic, plastic or metal material depending on needs and design requirements.

The constant velocity joint 10 also includes a barrier 68 that is located between the boot cover 52 and the outer race 36. The barrier 68 in the preferred embodiment is made of a polytetrafluoroethylene material, however it should be noted that any other type of plastic, ceramic or rubber like material may also be used. The barrier 68 creates a shield that will prevent heat and/or grease from coming in contact with the boot 56 of the constant velocity joint 10. The barrier 68 generally has a ring like appearance as shown in FIGS. 3 and 4 and includes a body section 70 that has a cup shaped cross section and a flange 72 extending from one end of the body section 70. The flange 72 is in contact with both the boot cover 52 and the outer race 36 of the constant velocity joint. The cup shape member extends towards the inner axial line of the constant velocity joint 10. The shield 68 also includes an orifice 74 which allows for the shaft 26 to rotate at appropriate speeds without compromising the shield 68 and the shields barrier effect against grease and heat from contacting the boot 56. The constant velocity joint 10 is set to operate at any number of angles, the barrier 68 will continuously provide heat and grease shield effects throughout any operation angle of the constant velocity joint 10. The shield 68 being made of polytetrafluoroethylene has insulating characteristics that will reduce the heat transfer from the outer race 36 to the boot cover 52. This will increase the life of the boot 56 by keeping high temperatures from interacting with the boot material. It should also be noted that the shield 68 acts as a gasket between the outer race 36 and the boot 52, providing a replacement for prior art gaskets or o-rings that had to be used to create a seal between the outer race and the boot cover. Constant velocity joints rotate at high speeds and create extreme temperatures and pressures which also effect the grease lubricating the joints. If either the grease and/or high temperatures directly contact the boot 56, the boot 56 will have premature ruptures, cracks and blow outs which will contaminate and ultimately destroy the constant velocity joint 10. The configuration of the barrier 68 will prevent any grease from contacting the boot and also prevent heat from being transferred to the boot 58 thus increasing the life of the constant velocity joint 10.

FIG. 5 shows an alternate embodiment of the constant velocity joint 210 and 268 barrier, it should be noted that like numerals represent like parts. The first shield 268 includes a second flange 278. The constant velocity joint 210 is similar to the joint 10 and has similar parts to those which were described above, any differences in the alternate embodiment will now be explained. The barrier has a first shield 268 but also includes a second shield 276 that is mounted on a shaft 226 directly adjacent to the inner race 244. The second shield 276 is also located within the cage 244 of the constant velocity joint 210. The second shield 276 generally has a ring like appearance with a cup shaped cross section. The second shield 276 is placed against the shaft 226 and will provide a further barrier and thus reduce the chances of any lubricant coming in contact with the boot 256 while working in unison with the first shield 268. The second shield 276 is in contact with the first shield 268, but it should be noted that the first and second shield may also be designed not to be in contact with each other. Thus, any grease that comes in contact with the second shield 276 will be directed towards the cup like shape of the first shield 268 and kept from contacting the boot member 256. The alternate embodiment includes all of the parts of the first embodiment but adds the second shield 276 into the barrier system for the constant velocity joint 210. Thus, either the one or two shield system will combat any issue where the heat and/or grease might cause deterioration of the boot 56 and eventual failure of the sealing system if contact is made with the boot by either the heat and/or grease lubricant.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A barrier for use in a constant velocity joint, said constant velocity joint having a lubricant within an outer race and a boot secured to a boot cover, said barrier including:
    a shield, said shield in contact with the outer race and an inside surface of the boot cover, said shield having a body with a generally cup-shaped cross section, said shield having a circumferential flange extending from said body, said shield reduces heat transfer between said outer race and said boot cover.

2. The barrier of claim 1 further including a second shield.

3. The barrier of claim 2 wherein said second shield generally has a cup-shaped cross section.

4. The barrier of claim 3 wherein said second shield is made of polytetrafluoroethylene.

5. The barrier of claim 1 wherein said shield is made of polytetrafluoroethylene.

6. The barrier of claim 1 wherein said shield keeps the lubricant from contaminating the boot.

7. The barrier of claim 1 wherein shield provides a gasket for increased sealability of the boot cover.

8. A constant velocity joint for use in a vehicle, the constant velocity joint having a lubricant therein, said constant velocity joint including:
    an outer race;
    an inner race located within said outer race;
    a boot cover contacting an end of said outer race;
    a shaft engaging said inner race;
    a boot in contact with said boot cover and said shaft; and
    a shield in contact with said outer race and said boot cover, said shield creates an insulating layer to reduce heat transfer between said outer race and said boot cover.

9. The constant velocity joint of claim 8 wherein said shield generally has a circumferential shape.

10. The constant velocity joint of claim 9 wherein said shield having a cup shaped portion.

11. The constant velocity joint of claim 10 wherein said shield having a flange extending from one end of said cup shaped portion.

12. A constant velocity joint for use in a vehicle, the constant velocity joint having a lubricant therein, said constant velocity joint including:
    an outer race;
    an inner race located within said outer race;
    a boot cover contacting an end of said outer race;
    a shaft engaging said inner race;
    a boot in contact with said boot cover and said shaft;
    a shield in contact with said outer race and said boot cover; and
    a second shield contacting said shaft.

13. The constant velocity joint of claim 12 wherein said second shield generally has a cup-shaped cross section and is in contact with said shield.

14. The constant velocity joint of claim 8 wherein said shield is made of a polytetrafluoroethylene.

15. The constant velocity joint of claim 8 wherein said shield protects said boot from contamination by the lubricant.

* * * * *

UNITED STATES PATENT AND TRADEMARK OFFICE
CERTIFICATE OF CORRECTION

PATENT NO. : 6,579,187 B2
APPLICATION NO. : 09/845069
DATED : June 17, 2003
INVENTOR(S) : John A. Ramey It is certified that error appears in the above-identified patent and that said Letters Patent is hereby corrected as shown below:

At Column 4, Line 64: Replace "cage 244" with --cage 248--

Signed and Sealed this

Nineteenth Day of December, 2006

JON W. DUDAS
*Director of the United States Patent and Trademark Office*